United States Patent
Jansen

(10) Patent No.: US 7,379,748 B2
(45) Date of Patent: May 27, 2008

(54) METHOD FOR SPEEDING UP SYNCHRONIZATION BY HAVING A SEARCH FREQUENCY LIST COMPRISING A LIMITED NUMBER OF SEARCH FREQUENCIES

(75) Inventor: Kaj Jansen, Salo (FI)

(73) Assignee: Nokia Corporation, Espoo (FI)

( * ) Notice: Subject to any disclaimer, the term of this patent is extended or adjusted under 35 U.S.C. 154(b) by 132 days.

(21) Appl. No.: 10/512,178

(22) PCT Filed: Apr. 26, 2002

(86) PCT No.: PCT/IB02/01399

§ 371 (c)(1),
(2), (4) Date: Oct. 22, 2004

(87) PCT Pub. No.: WO03/092313

PCT Pub. Date: Nov. 6, 2003

(65) Prior Publication Data

US 2005/0221846 A1    Oct. 6, 2005

(51) Int. Cl.
*H04Q 7/20* (2006.01)
*H04B 7/00* (2006.01)

(52) U.S. Cl. ............... 455/525; 375/142; 375/145; 375/149; 375/150; 370/329; 370/331; 370/335; 370/337; 370/342; 370/347; 370/434; 370/441; 379/58; 379/59; 379/60; 379/63

(58) Field of Classification Search ............. 455/62, 455/166.2, 184.1, 434, 435.3, 455, 511, 525, 455/512–516
See application file for complete search history.

(56) References Cited

U.S. PATENT DOCUMENTS

| | | | | |
|---|---|---|---|---|
| 5,241,691 A | * | 8/1993 | Owen | 455/517 |
| 5,509,051 A | * | 4/1996 | Barnett et al. | 455/443 |
| 5,517,677 A | * | 5/1996 | Moon | 455/161.1 |
| 5,794,146 A | * | 8/1998 | Sevcik et al. | 455/434 |
| 5,822,686 A | * | 10/1998 | Lundberg et al. | 455/161.3 |
| 5,937,351 A | | 8/1999 | Seekins et al. | |
| 6,259,917 B1 | * | 7/2001 | Elzein | 455/435.2 |
| 6,282,420 B1 | | 8/2001 | Bamburak et al. | |
| 6,343,070 B1 | * | 1/2002 | Klas et al. | 370/329 |
| 6,625,200 B1 | * | 9/2003 | Dent | 375/142 |
| 6,807,163 B1 | * | 10/2004 | Shi | 370/337 |
| 6,885,869 B2 | * | 4/2005 | Raith | 455/456.6 |
| 6,917,809 B2 | * | 7/2005 | Horwath et al. | 455/436 |

(Continued)

FOREIGN PATENT DOCUMENTS

WO    WO 9736449    10/1997

(Continued)

*Primary Examiner*—Nay Maung
*Assistant Examiner*—Zhiyu Lu
(74) *Attorney, Agent, or Firm*—Ware, Fressola, Van Der Sluys & Adolphson, LLP

(57) ABSTRACT

A method for initial synchronization in a mobile telecommunications network to connect a mobile terminal (10) to a base station (12). The mobile terminal has a search frequency list comprising a limited number of search frequencies. The method comprises the step of searching for an available frequency in the order of the search frequency list. The search frequency list further comprises count values, indicating how frequently the corresponding frequency has been used, wherein the order of at least some of the search frequencies depends on the count values.

20 Claims, 4 Drawing Sheets

U.S. PATENT DOCUMENTS

| | | | |
|---|---|---|---|
| 2001/0026542 A1* | 10/2001 | Kusaka et al. | 370/331 |
| 2003/0083064 A1* | 5/2003 | Cooper | 455/432 |
| 2005/0113089 A1* | 5/2005 | Bamburak et al. | 455/435.2 |

FOREIGN PATENT DOCUMENTS

| | | |
|---|---|---|
| WO | WO 9965270 | 12/1999 |
| WO | WO 0076237 | 12/2000 |

* cited by examiner

| HPLMN Frequency (101) | Count Value (102) | Time Stamp (103) |
|---|---|---|
| F1 | 235 | 24 |
| F2 | 204 | 21 |
| F3 | 23 | 156 |
| F4 | 2 | 25 |

(100)

| Roaming PLMN Frequency (111) | Count Value (112) | Time Stamp (113) |
|---|---|---|
| F'1 | 25 | 21 |
| F'2 | 14 | 45 |
| F'3 | 12 | 56 |
| F'4 | 1 | 36 |

(110)

| Search Frequency (121) | Count Value (122) |
|---|---|
| F2 | 204 |
| F1 | 235 |
| F3 | 23 |
| F4 | 2 |
| F'1 | 25 |
| F'2 | 14 |
| F'3 | 12 |
| F'4 | 1 |

METHOD FOR SPEEDING UP SYNCHRONIZATION BY HAVING A SEARCH FREQUENCY LIST COMPRISING A LIMITED NUMBER OF SEARCH FREQUENCIES

CROSS REFERENCE TO RELATED APPLICATIONS

This application is for entry into the U.S. national phase under §371 for International Application No. PCT/IB02/01399 having an international filing date of Apr. 26, 2002, and from which priority is claimed under all applicable sections of Title 35 of the United States Code including, but not limited to, Sections 120, 363 and 365(c).

TECHNICAL FIELD OF INVENTION

This invention relates to a method for initial synchronization in a mobile telecommunications network to connect a mobile terminal to a base station, the mobile terminal having a search frequency list comprising a limited number of search frequencies, the method comprising the step of searching for an available frequency in the order of the search frequency list. The invention also relates to a mobile terminal.

BACKGROUND ART

In a telecommunications network according to the above each operator belongs to a public land mobile network (PLMN), and a user's own operator is called a home public land mobile network (HPLMN). The user can visit other PLMNs and there are mechanisms to exchange charging data so that the user can be billed correctly. In UMTS (Universal Mobile Telecommunications System), the charging mechanisms have been specified by 3GPP (Third Generation Partnership Project). When a user switches from one PLMN to another PLMN, this is called roaming.

One operator typically operates on 2 or 3 frequency carriers. Each carrier will only support one operator. In every cell there can be several frequency carrier belonging to different operators.

In order for a mobile terminal, for example a mobile phone, to initially find a cell and a frequency carrier in WCDMA (wideband code-division multiple access, the access method in UMTS) an initial cell selection procedure is performed.

The procedure is described in "Introduction to 3G mobile communication" by Juha Korhonen and 3GPP doc 25.214 Annex C, and includes the following steps from the mobile phone's point of view:

Initial Cell-selection Procedure

Slot Synchronization

1) Search for primary synchronization channels (P-SCH). All P-SCHs have the same fixed primary synchronization code.

2) Once such a channel is found, acquire time slot synchronization from it. This is typically done with a single matched filter (or any similar device) matched to the primary synchronization code which, as mentioned above, is common to all cells. The slot timing of the cell can be obtained by detecting peaks in the matched filter output.

Frame Synchronization and Code-group Identification

3) Acquire frame synchronization from the corresponding secondary synchronization channels (S-SCH). This is done by correlating the received signal with all possible secondary synchronization code sequences, and identifying the maximum correlation value. Since the cyclic shifts of the sequences are unique, the code group as well as the frame synchronization is determined.

Scrambling-code Detection

4) Acquire the primary scrambling code from the corresponding CPICH (common pilot channel).

5) Decode system information from the cell to check whether it is a suitable cell for camping (i.e. it contains the right PLMN code and access to it is allowed). The mobile phone determines the exact primary scrambling code used by the found cell. The primary scrambling code is typically identified through symbol-by-symbol correlation over the CPICH with all codes within the code group identified in the second step. After the primary scrambling code has been identified, the Primary CCPCH (common control physical channel) can be detected, and the system and cell specific BCH (broadcast channel) information can be read. If the mobile phone has received information about which scrambling codes to search for, the procedure can be optimised.

The procedure is executed on one carrier frequency at a time. The mobile phone uses a frequency list which can be a full frequency list with all possible frequencies. The procedure is searching for a suitable frequency in the list. A problem with the frequency list is that the searching can be time consuming.

SUMMARY OF THE INVENTION

An object of the invention is to provide a general method to speed up and improve initial synchronization.

The invention provides, according to a first aspect, a method for initial synchronization in a mobile telecommunications network to connect a mobile terminal to a base station, the mobile terminal having a search frequency list comprising a limited number of search frequencies, the method comprising the step of searching for an available frequency in the order of the search frequency list, the search frequency list further comprising count values, indicating how frequently the corresponding frequency has been used, wherein the order of at least some of the search frequencies depends on the count values.

The search frequency list is used in initial synchronization or when the mobile terminal is roaming and tries to find HPLMN.

The search frequency list may be formed in the main processor and delivered to and used in the physical layer.

By searching in the order of the count values the more frequently used frequencies and therefore more likely frequencies are searched first. An advantage with this is that it speeds up the initial synchronization.

In one embodiment of the invention the step of searching for an available frequency is performed during a maximum time for each frequency in the search frequency list, said maximum time being weighted in accordance with the corresponding count value.

An advantage with this is that more time is spent on searching for more likely frequencies. This speeds up the search.

In another embodiment of the invention the first frequency of the search frequency list is the last one used.

The last frequency used is the most likely frequency to be used again, and therefore this frequency is first in the search frequency list.

In one embodiment of the invention the search frequency list comprises a combination of a HPLMN frequency list and a Roaming PLMN frequency list.

The HPLMN frequency list is controlled by the mobile terminal. The mobile terminal can start with a search frequency list which has HPLMN and Roaming PLMN (RPLMN) frequencies included. The frequencies in HPLMN and Roaming PLMN frequency lists are the most likely frequencies to be used.

In one embodiment of the invention the first frequency of the search frequency list is the last one used, the next frequencies are the frequencies in the HPLMN frequency list sorted by the count values and the following frequencies are the frequencies in the Roaming PLMN frequency list sorted by the count values.

This list provides a very efficient way of finding the searched frequency.

In another embodiment of the invention the HPLMN frequency list comprises time stamps, which indicate when the corresponding frequencies were last used.

In one embodiment of the invention the method further comprises the step of using the time stamps to determine which HPLMN frequency is to be removed from the HPLMN frequency list due to a shortage of space.

In this way the HPLMN frequency least likely to be used is removed from the list when a new frequency is added.

In another embodiment of the invention the determined HPLMN frequency to be removed is the one with the oldest time stamp.

A frequency with the oldest time stamp is the frequency used longest way back in time and thus the frequency in the HPLMN frequency list probably least likely to be used again. This frequency is therefore selected and removed from the list when the list is full and a new frequency is to be added.

In one embodiment of the invention the Roaming PLMN frequency list comprises time stamps, which indicate when the corresponding frequencies were last used.

In another embodiment of the invention the method further comprises the step of using the time stamps to determine which Roaming PLMN frequency is to be removed from the Roaming PLMN frequency list due to a shortage of space.

The time stamps in the Roaming PLMN frequency list are used as in the HPLMN frequency list.

In another embodiment of the invention the determined Roaming PLMN frequency to be removed is the one with the oldest time stamp.

In one embodiment of the invention the HPLMN frequency list and the Roaming PLMN frequency list comprise count values, the method further comprising the step of incrementing a count value in idle mode and in traffic mode when a corresponding frequency is used.

In another embodiment of the invention said mobile telecommunications network uses Wideband CDMA as access method.

According to a second aspect, the invention also involves a computer program product directly loadable into a memory of a processor, where the computer program product comprises program code for performing the method according to any of the embodiments described above when executed by said processor.

According to a third aspect, the invention also comprises a mobile terminal comprising a search frequency list with a limited number of search frequencies, the mobile terminal being arranged to search for an available frequency in the order of the search frequency list so as to synchronize with a base station in a mobile telecommunications network, wherein the search frequency list further comprises count values, indicating how frequently the corresponding frequency has been used, wherein the order of at least some of the search frequencies depends on the count values.

The mobile terminal may for instance be a mobile phone, a personal digital assistant, a laptop computer with a GSM or UMTS interface, etc.

In one embodiment of the invention the mobile terminal is arranged to search for an available frequency during a maximum time for each frequency in the search frequency list, said maximum time being weighted in accordance with the corresponding count value.

BRIEF DESCRIPTION OF THE DRAWINGS

A preferred embodiment of the present invention will now be described in more detail, reference being made to the enclosed drawings, in which:

FIG. 3 is a schematic illustration of a HPLMN frequency list, a roaming PLMN frequency list and a search frequency list according to the present invention.

DETAILED DESCRIPTION OF A PREFERRED EMBODIMENT OF THE INVENTION

Figure 1:
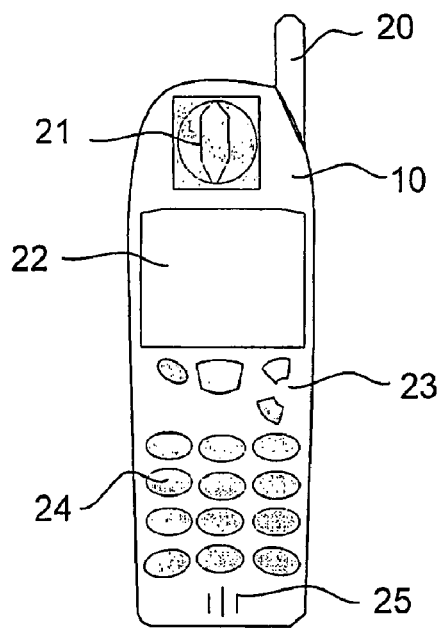
FIG. 1 is a schematic front view of a mobile telephone.

FIG. 1 shows a mobile terminal and more specifically a mobile telephone 10. The mobile telephone may be any commercially available device for a mobile telecommunications system such as GSM, UMTS or D-AMPS.

As is well known in the technical field, the mobile telephone 10 comprises an antenna 20, a loudspeaker 21, a display 22, a first plurality of navigation keys 23, a second plurality of alphanumeric keys 24, and a microphone 25.

Figure 2:
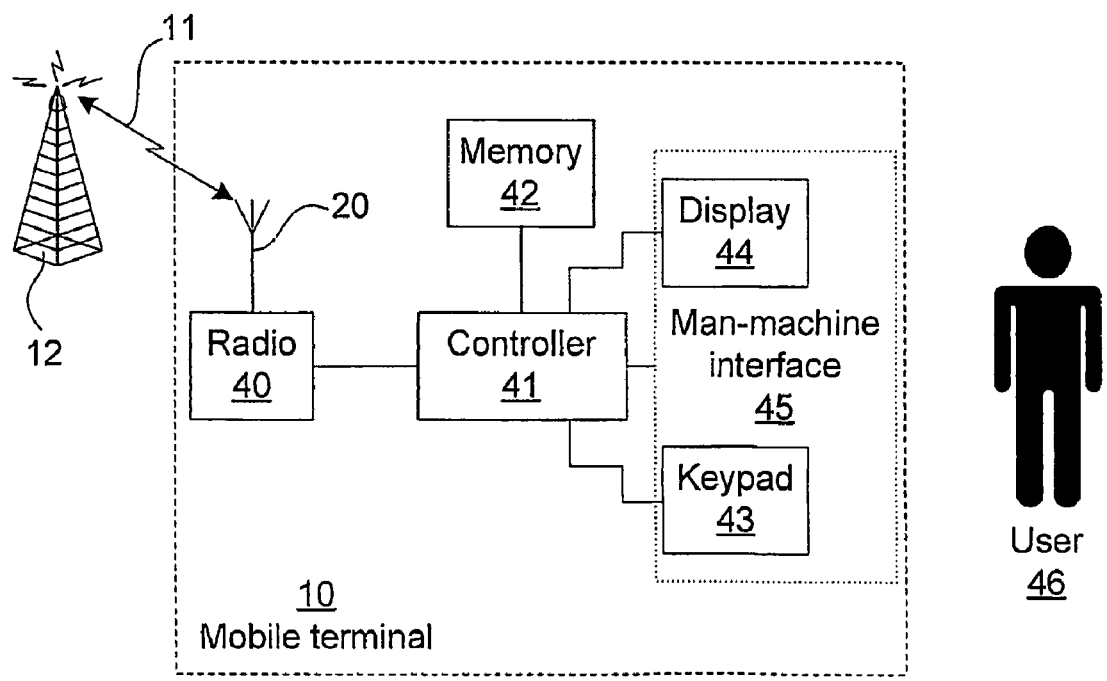
FIG. 2 is a schematic block diagram of some components, with in the context of the present invention, of the mobile telephone shown in FIG. 1.

FIG. 2 illustrates some internal components, within the context of the present invention, of the mobile telephone 10. A controller 41 is responsible for the overall operation of the mobile telephone 10 and is preferably implemented by any commercially available CPU ("Central Processing Unit"), DSP ("Digital Signal Processor") or any other electronic programmable logic device. The controller 41 is coupled to a radio interface 20, 40, comprising the antenna 20 and radio circuitry 40. The radio interface 20, 40 is responsible for establishing and maintaining a wireless link 11 to the base transceiver station 12. As is well known to a man skilled in the art, the radio circuitry 40 comprises a series of analogue and digital electronic components, which together form a radio receiver and transmitter. The radio circuitry 40 comprises, i.e., bandpass filters, amplifiers, mixers, local oscillators, lowpass filters, AD converters, etc.

The controller 41 is also connected to an electronic memory 42, such as a RAM memory, a ROM memory, an EEPROM memory, a flash memory, or any combination thereof. The memory 42 is used for various purposes by the controller 41, one of them being for storing data and program instructions, which form a man-machine interface 45. The man-machine interface 45 also involves a keypad 43 (corresponding to the keys 23, 24 in FIG. 1) and a display 44 (corresponding to the display 22 in FIG. 1). A user 46 of the mobile telephone 10 will operate the telephone through the man-machine interface 45, as is well known per se.

The mobile phone 10 comprises a HPLMN frequency list 100, shown in FIG. 3. The HPLMN frequency list 100 is a list of HPLMN frequencies 101, denoted F1, F2, F3 and F4. The HPLMN frequencies 101 are sorted by the count values 102. Each count value 102 is incremented by one when the corresponding frequency 101 is used in idle mode or in traffic mode. The count value 102 may be limited to a MAX_COUNT_VALUE of 1000. The HPLMN frequency list 100 also comprises time stamps 103, which indicate when the corresponding HPLMN frequency 101 was last used. The time stamps 103 are used when the frequency list is full and a new frequency is going to be added. The HPLMN frequency F2 earliest used is then removed from the HPLMN frequency list 100, and the new frequency is added to the list.

The mobile phone 10 also comprises a Roaming PLMN frequency list 110 which is a list of frequencies F'1, F'2, F'3 and F'4, that were in use in a PLMN where the mobile phone 10 was roaming. The roaming PLMN frequencies 111 are sorted by count values 112. Each count value 112 may be limited to a MAX_COUNT_VALUE of for example 1000. The Roaming PLMN frequency list 110 also comprises time stamps 113, which have the same function as in the HPLMN frequency list 100.

The initial synchronization comprises the initial cell-selection procedure described in the background section. The initial cell-selection procedure is executed in the physical layer, and the RRC (Radio Resource Control) layer has only a management role.

The procedure is performed on one carrier frequency at a time and in the frequency order of a search frequency list 120, until a suitable frequency is found.

The search frequency list 120 is a short frequency list used in initial synchronization. It can also be used when the mobile phone 10 is roaming and tries to find HPLMN.

The search frequency list 120 comprises search frequencies 121 with corresponding count values 122 and is built up in the main processor. The first search frequency F2 of the search frequency list 120 is the latest one used. The next search frequencies F1, F3 and F4 are retrieved from the HPLMN frequency list 100. The next frequencies F'1, F'2, F'3 and F'4 are retrieved from the Roaming PLMN frequency list 110. The corresponding count values 102, 112 are also added in the search frequency list 120.

The time spent on searching for a certain frequency among the search frequencies 121 is weighted with the corresponding count values 122. For example, the search time for a search frequency 121 can be calculated by multiplying a predetermined max search time, for example 50 ms, with the corresponding Count Value 122 divided by the MAX_COUNT_VALUE (=1000). By this a longer time is spent searching for a more frequently used frequency than the time spent on searching for a more rarely used frequency. For example, the time spent on searching for F2 is 50 ms*204/1000=10.2 ms and for F3 is 50 ms* 23/1000=1.15 ms.

The mobile phone 10 repeats this procedure until the first suitable cell/frequency is found for camping. Once the mobile phone 10 has managed to camp onto a cell, it decodes the system information.

Figure 4:
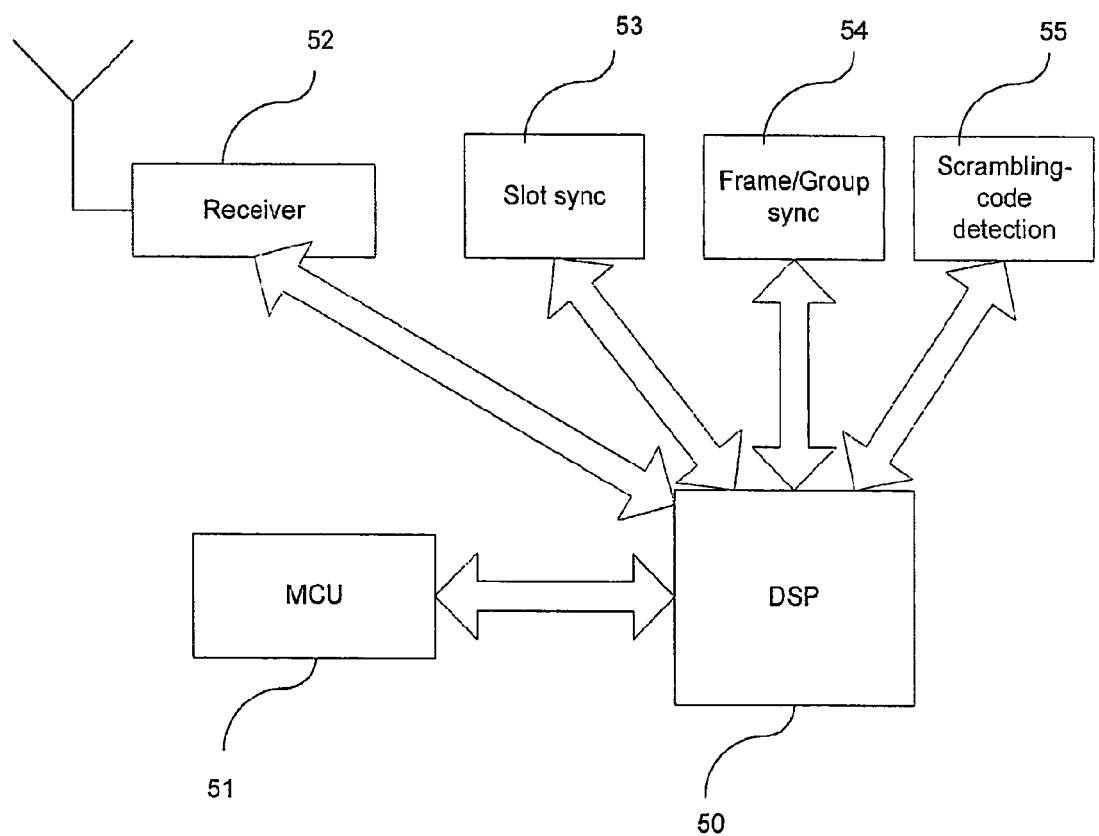
FIG. 4 is a schematic block diagram for the purpose of explaining the synchronization search process.

FIG. 4 shows a general block diagram of one embodiment in which the controller 41, shown in FIG. 2, is implemented by a DSP (Digital Signal Processor) 50. The DSP controls the physical layer blocks which perform the actual search operation. The DSP 50 is communicating with a MCU (Main Control Unit) 51 and a receiver 52.

The DSP 50 controls the initial cell-selection procedure comprising the slot synchronization 53, frame synchronization and code-group identification 54; and scrambling code detection 55.

Figure 5:
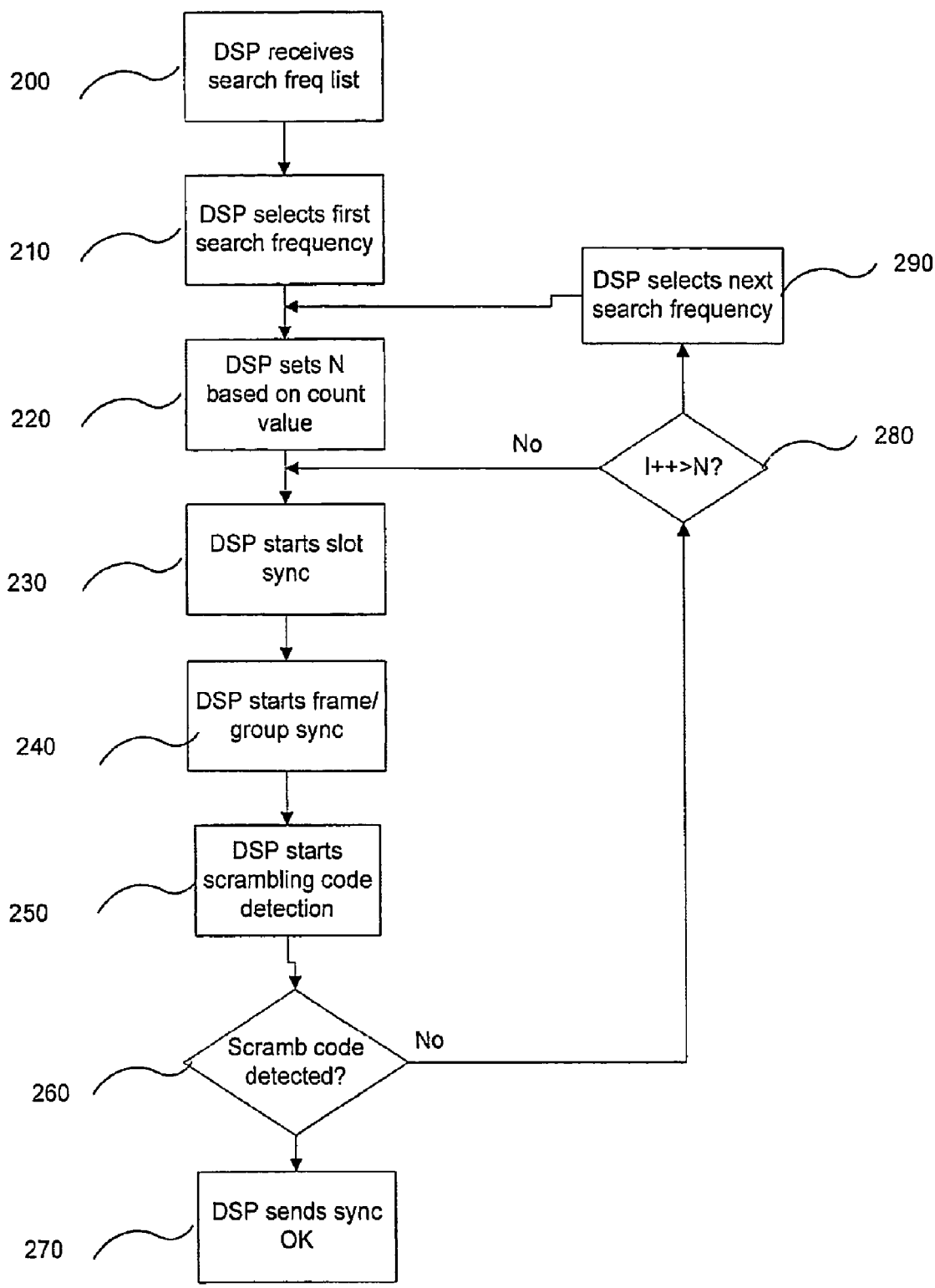
FIG. 5 is a schematic flowchart of one realization of weighting in the synchronization search process.

FIG. 5 is a flowchart explaining one realization of the synchronization procedure which is as follows. In step 200 the DSP 50 receives the search frequency list 120 from the MCU 51. In step 210 the DSP 50 selects the first search frequency 121 in the search frequency list 120. A count number I is initially set to zero. In step 220 the DSP sets a weighting number N based on the count value 122 corresponding to the first search frequency 121. For example, N can be calculated by multiplying a maximum value of N, for example 100, with the current count value 122 divided by the MAX_COUNT_VALUE (=1000). N is then the integer value of this result and can be the number of times the DSP tries to find this current search frequency before trying the next search frequency in the search frequency list 120. For example, for the first search frequency according to the search frequency list 120 in FIG. 3, N may be calculated by 100*204/1000=20.4. N is then 20.

In step 230 the DSP starts the slot synchronization. In step 240 the DSP starts the frame synchronization and the code-group identification. The DSP then starts, in step 250, scrambling code identification. In step 260 a check is made to control if the scrambling code is detected. If the scrambling code is detected the DSP sends, in step 270, a signal to the MCU 51, which signal comprises the information that the synchronization is OK. If the scrambling code is not detected the count number I is increased by one, and in a step 280 the weighting number N is compared to the first count number I. If the first count number I is not larger than N, a new attempt to find the scrambling code with the same search frequency as before is made. For the first frequency this loop can be performed 21 times before I>N.

If the scrambling code has not been detected and I is larger than N, the DSP selects, in step 290, the next search frequency 121 in the search frequency list 120 and continues the flow chart. The count number I is set to zero, the DSP sets the second count value N based on the second search frequency 121 and the loop continues. For the second frequency, 100*235/1000=23,5 and N is decided to be 23.

If no suitable frequency is found the mobile phone has to search every frequency in the system. The memory 42 usually maintains this kind of lists.

WCDMA is typically an asynchronous system, but if relative timing of the base stations is signalled to the mobile phone, then the mobile phone can skip the cell search procedure when performing neighbour cell measurements for cell reselection/handoff.

The foregoing embodiment of the present invention provides an exemplary illustration and description, but is not intended to be exhaustive or to limit the invention to the precise form disclosed. Modification and variations are possible in light of the above teachings or may be acquired from practice of the invention.

For example the mobile terminal 10 can also be a personal digital assistant, or a laptop computer with a UMTS interface. Furthermore the search list can be built up in other ways depending for example of its size.

The invention claimed is:

1. A method, comprising:
providing a search frequency list comprising a plurality of search frequencies and a count value for each frequency of said plurality of search frequencies indicating how frequently each frequency has been used, and
searching for an available frequency in the order of the search frequency list,
wherein the order of at least some of the search frequencies depends on the count values, and
wherein searching for an available frequency is performed during a maximum time for each frequency in the search frequency list, said maximum time being weighted in accordance with the corresponding count value.

2. The method according to claim 1, wherein the first frequency of the search frequency list is the last one used.

3. The method according to claim 1, wherein the search frequency list comprises a combination of a home public land mobile network frequency list and a Roaming public land mobile network frequency list.

4. The method according to claim 3, wherein the first frequency of the search frequency list is the last one used, the next frequencies are the frequencies in the home public land mobile network frequency list sorted by the count values and the following frequencies are the frequencies in the Roaming public land mobile network frequency list sorted by the count values.

5. The method according to claim 3, wherein the home public land mobile network frequency list comprises time stamps, which indicate when the corresponding frequencies were last used.

6. The method according to claim 5, further comprising using the time stamps to determine which home public land mobile network frequency is to be removed from the home public land mobile network frequency list due to a shortage of space.

7. The method according to claim 6, wherein the determined home public land mobile network frequency to be removed is the one with the oldest time stamp.

8. The method according to claim 3, wherein the Roaming public land mobile network frequency list comprises time stamps, which indicate when the corresponding frequencies were last used.

9. The method according to claim 8, further comprising using the time stamps to determine which Roaming public land mobile network frequency is to be removed from the Roaming public land mobile network frequency list due to a shortage of space.

10. The method according to claim 9, wherein the determined Roaming public land mobile network frequency to be removed is the one with the oldest time stamp.

11. The method according to claim 3, wherein the home public land mobile network frequency list and the Roaming public land mobile network frequency list comprise count values, the method further comprising incrementing a count value in idle mode and in traffic mode when a corresponding frequency is used.

12. A computer readable medium encoded with a computer program product, wherein the computer program product comprises program code for
providing a search frequency list comprising a plurality of search frequencies and a count value for each frequency of said plurality of search frequencies indicating how frequently each frequency has been used, and
searching for an available frequency in the order of the search frequency list,
wherein the order of at least some of the search frequencies depends on the count values, and
wherein searching for an available frequency is performed during a maximum time for each frequency in the search frequency list, said maximum time being weighted in accordance with the corresponding count value.

13. An apparatus, comprising:
a search frequency list comprising a plurality of search frequencies and a count value for each frequency of said plurality of search frequencies indicating how frequently each frequency has been used, and
a controller configured to search for an available frequency in the order of the search frequency list so as to synchronize with a base station in a mobile telecommunications network,
wherein the order of at least some of the search frequencies depends on the count values, and
wherein the controller is configured to search for an available frequency during a maximum time for each frequency in the search frequency list, said maximum time being weighted in accordance with the corresponding count value.

14. An apparatus, comprising:
a search frequency list comprising a plurality of search frequencies and a count value for each frequency of said plurality of search frequencies indicating how frequently each frequency has been used, and
means for searching for an available frequency in the order of the search frequency list so as to synchronize with a base station in a mobile telecommunications network,
wherein the order of at least some of the search frequencies depends on the count values, and
wherein the apparatus further comprises means for searching for an available frequency during a maximum time for each frequency in the search frequency list, said maximum time being weighted in accordance with the corresponding count value.

15. The apparatus according to claim 13, wherein a first frequency of the search frequency list is the last frequency that was used.

16. The apparatus according to claim 14, wherein a first frequency of the search frequency list is the last frequency that was used.

17. The apparatus according to claim 13, wherein said apparatus is configured to operate as part of a mobile terminal.

18. The apparatus according to claim 14, wherein said apparatus is configured to operate as part of a mobile terminal.

19. The method according to claim 1, further comprising performing synchronization in a mobile telecommunication network.

20. The method according to claim 19, wherein said mobile telecommunication network uses wideband code-division multiple access as an access method.

* * * * *